US012656926B2

(12) United States Patent
Guo et al.

(10) Patent No.: US 12,656,926 B2
(45) Date of Patent: Jun. 16, 2026

(54) METHOD, DEVICE, TERMINAL DEVICE AND STORAGE MEDIUM FOR INFORMATION PROCESSING

(71) Applicant: Beijing Zitiao Network Technology Co., Ltd., Beijing (CN)

(72) Inventors: Xinlei Guo, Beijing (CN); Shijie Liu, Beijing (CN); Ronghui Zhang, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 165 days.

(21) Appl. No.: 18/574,970

(22) PCT Filed: Sep. 15, 2022

(86) PCT No.: PCT/CN2022/118988
§ 371 (c)(1),
(2) Date: Dec. 28, 2023

(87) PCT Pub. No.: WO2023/040948
PCT Pub. Date: Mar. 23, 2023

(65) Prior Publication Data
US 2024/0319837 A1     Sep. 26, 2024

(30) Foreign Application Priority Data

Sep. 16, 2021     (CN) .......................... 202111087699.6

(51) Int. Cl.
G06F 3/0481          (2022.01)
(52) U.S. Cl.
CPC .................................. G06F 3/0481 (2013.01)

(58) Field of Classification Search
CPC .. G06F 3/0481; G06F 3/04817; G06F 3/0482; G06F 3/04842
See application file for complete search history.

(56) References Cited

U.S. PATENT DOCUMENTS

| | | | |
|---|---|---|---|
| 2008/0065460 A1 | 3/2008 | Raynor | |
| 2011/0131285 A1 | 6/2011 | Liao et al. | |

(Continued)

FOREIGN PATENT DOCUMENTS

| | | |
|---|---|---|
| CN | 102947845 A | 2/2013 |
| CN | 102982440 A | 3/2013 |

(Continued)

OTHER PUBLICATIONS

Haiyan Chen et al., A kind of personalized search method based on the information Extraction, May 1, 2016, IEEE International Conference of Online Analysis and Computing Science, pp. 1-4 (Year: 2016).*

(Continued)

*Primary Examiner* — Tam T Tran
(74) *Attorney, Agent, or Firm* — Astute IP Law Group

(57)          ABSTRACT

The disclosure provides an information processing method, apparatus, terminal device, and storage medium. The disclosure provides a method for information processing, including: displaying first task information and a target identifier associated with the first task information (S11); in response to a first operation for the target identifier, displaying the second task information associated with the first task information (S12), in presence of second task information associated with the first task information. By means of the method, a user can quickly learn which information is the task information associated with first task information, thereby improving the information viewing efficiency.

18 Claims, 5 Drawing Sheets

ZHANG YI

ZHANG ER

ZHANG SAN

ZHANG SI

ZHANG SAN

FIRST TYPE OF INFORMATION
SECOND TYPE OF INFORMATION @LI SI△
SECOND TYPE OF INFORMATION @WANG WU△

WANG WU          TASK DETAILS

ALIGNED TASK

FIRST TYPE OF INFORMATION YYY

SECOND TYPE OF INFORMATION YYY

(56) References Cited

U.S. PATENT DOCUMENTS

| | | | | |
|---|---|---|---|---|
| 2011/0314404 | A1* | 12/2011 | Kotler | ................. G06Q 10/109 |
| | | | | 715/772 |
| 2020/0201496 | A1 | 6/2020 | Wong | |
| 2020/0326685 | A1* | 10/2020 | Lee | ........................ B25J 9/1679 |

FOREIGN PATENT DOCUMENTS

| | | | |
|---|---|---|---|
| CN | 107077661 | A | 8/2017 |
| CN | 108595678 | A | 9/2018 |
| CN | 109155025 | A | 1/2019 |
| CN | 109828883 | A | 5/2019 |
| CN | 110178151 | A | 8/2019 |
| CN | 110866685 | A | 3/2020 |
| CN | 111242567 | A | 6/2020 |
| CN | 111523851 | A | 8/2020 |
| CN | 112215586 | A | 1/2021 |
| CN | 112751746 | A | 5/2021 |
| CN | 112950169 | A | 6/2021 |
| CN | 113741755 | A | 12/2021 |

OTHER PUBLICATIONS

Dong Zhou et al., Optimizing User Interaction for Web-based Mobile Tasks, Jul. 1, 2010, Annual International Symposium on Applications and the Internet, pp. 68-76 (Year: 2010).*
International Search Report (with English translation) and Written Opinion issued in PCT/CN2022/118988, dated Dec. 7, 2022, 12 pages provided.
Office Action issued in corresponding Chinese Application No. 202111087699.6, dated Dec. 9, 2022, with English machine translation.

* cited by examiner

DISPLAY FIRST TASK INFORMATION AND A TARGET
IDENTIFIER ASSOCIATED WITH THE FIRST TASK
INFORMATION — S11

IN RESPONSE TO A FIRST OPERATION ON FOR THE
TARGET IDENTIFIER, DISPLAY THE SECOND TASK
INFORMATION ASSOCIATED WITH THE FIRST TASK
INFORMATION, IN PRESENCE OF SECOND TASK
INFORMATION ASSOCIATED WITH THE FIRST TASK
INFORMATION — S12

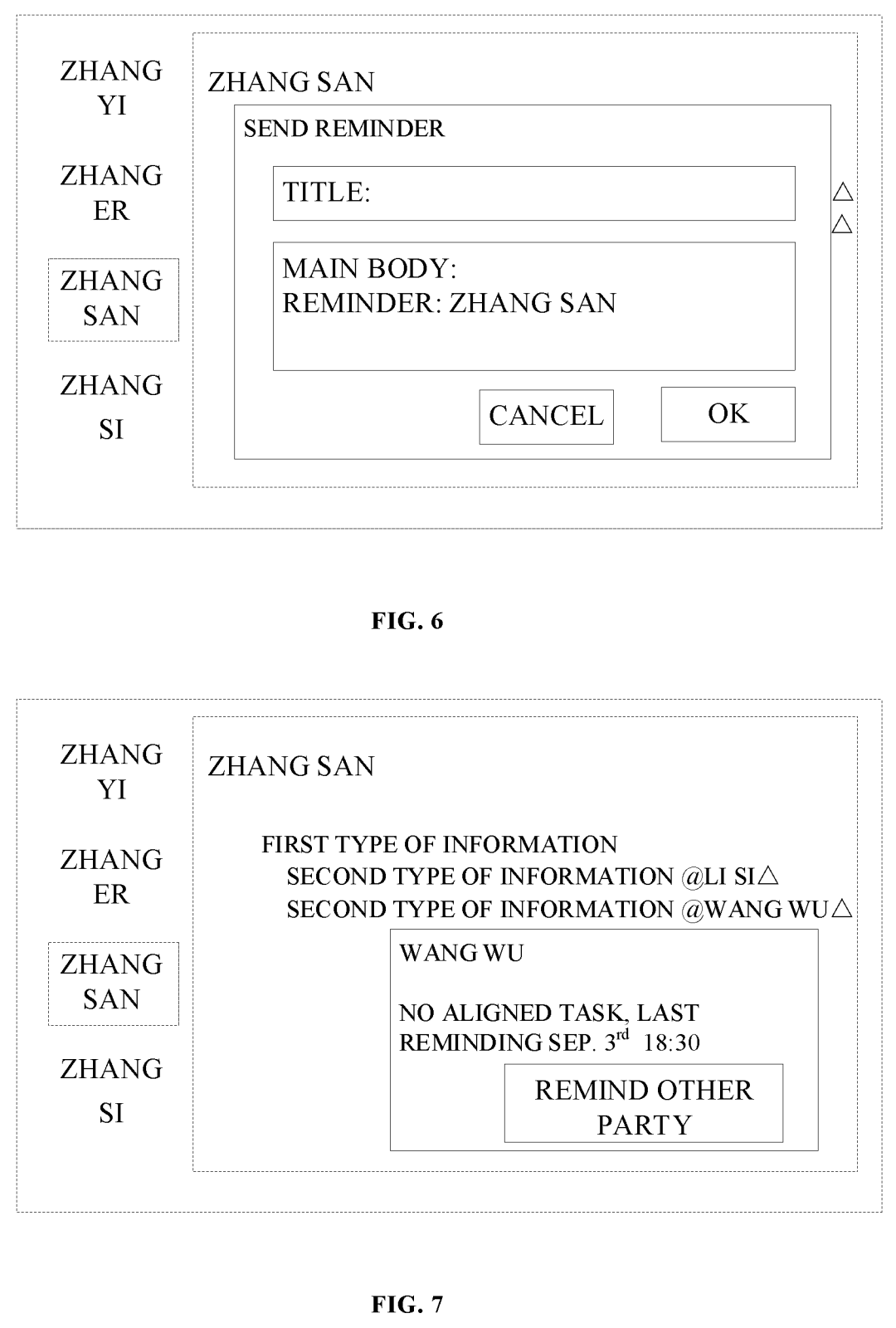

ZHANG
YI

ZHANG
ER

ZHANG
SAN

ZHANG
SI

ZHANG SAN

SEND REMINDER

TITLE:

△
△

MAIN BODY:
REMINDER: ZHANG SAN

CANCEL      OK

FIG. 6

ZHANG
YI

ZHANG
ER

ZHANG
SAN

ZHANG
SI

ZHANG SAN

FIRST TYPE OF INFORMATION
    SECOND TYPE OF INFORMATION @LI SI△
    SECOND TYPE OF INFORMATION @WANG WU△

WANG WU

NO ALIGNED TASK, LAST
REMINDING SEP. 3$^{rd}$ 18:30

REMIND OTHER
PARTY

FIG. 7

METHOD, DEVICE, TERMINAL DEVICE AND STORAGE MEDIUM FOR INFORMATION PROCESSING

CROSS-REFERENCE OF RELATED APPLICATION(S)

This present application is based on and claims priority to Chinese Patent Application No. 202111087699.6, filed on Sep. 16, 2021, entitled "METHOD, DEVICE, TERMINAL DEVICE AND STORAGE MEDIUM FOR INFORMATION PROCESSING", which is hereby incorporated by reference in its entirety.

FIELD

The present disclosure relates to the field of computer technology, and more particularly to a method, apparatus, terminal device and storage medium for information processing.

BACKGROUND

Within an enterprise, corresponding task information is usually set to complete a project or task. There are various forms of task information, and a task can have several sub-tasks. There may be dependencies or time sequences between different tasks.

SUMMARY

The present disclosure provides a method, apparatus, terminal device and storage medium for information processing.

The present disclosure adopts following technical solutions.

In some embodiments, the present disclosure provides a method for processing information, including:

displaying first task information and a target identifier associated with the first task information;

in response to a first operation for the target identifier, displaying the second task information associated with the first task information, in presence of second task information associated with the first task information.

In some embodiments, the present disclosure provides an information processing apparatus including:

a display unit configured to display first task information and a target identifier associated with the first task information;

a control unit configured to in response to a first operation for the target identifier, display the second task information associated with the first task information is present, in presence of second task information associated with the first task information.

In some embodiments, the present disclosure provides a terminal device including: at least one memory and at least one processor;

where the at least one memory is used for storing program codes, and the at least one processor is used for invoking the program codes stored in the at least one memory to perform the above method.

In some embodiments, the present disclosure provides a computer-readable storage medium for storing program codes, where the program codes, when executed by a processor, causes the processor to perform the above method.

A method for processing information provided by the present disclosure, includes: displaying first task information and a target identifier associated with the first task information; in response to a first operation for the target identifier, displaying the second task information associated with the first task information, in presence of second task information associated with the first task information. The method proposed in the present disclosure enables a user to quickly know which information is the task information that is associated with the first task information, thereby improving the viewing efficiency of the information.

BRIEF DESCRIPTION OF THE DRAWINGS

In conjunction with the accompanying drawings and with reference to the following detailed description, the above and other features, advantages and aspects of the various embodiments of the present disclosure will become more apparent. Throughout the drawings, same or similar reference signs denote same or similar elements. It should be understood that the drawings are illustrative and that elements and elements are not necessarily drawn in scale.

FIG. 6 is a schematic diagram of displaying a reminding after triggering according to embodiments of the present disclosure.

FIG. 7 is a schematic diagram of displaying a target identification after the first operation is performed according to embodiments of the present disclosure.

DETAILED DESCRIPTION

Figure 1:
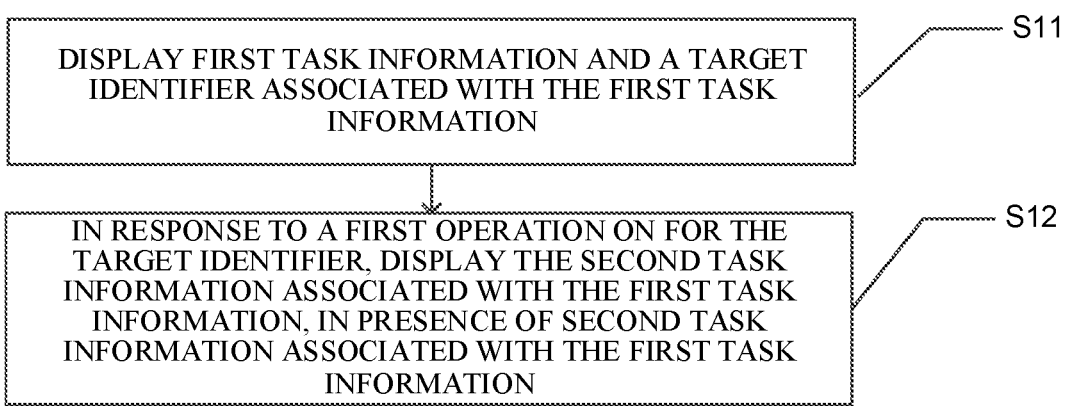
FIG. 1 is a flowchart of an information processing method according to embodiments of the present disclosure.

Following embodiments of the present disclosure will be described in more detail with reference to the accompanying drawings. Although certain embodiments of the present disclosure are shown in the drawings, it should be understood that the present disclosure can be implemented in various forms and should not be construed as limited to embodiments set forth herein. On the contrary, these embodiments are provided for a more thorough and complete understanding of the present disclosure. It should be understood that the drawings and embodiments of the present disclosure are for illustrative purposes only and are not intended to limit the scope of the present disclosure.

It should be understood that the various steps described in method implementations of this disclosure can be executed in parallel. In addition, the method implementations can include additional steps and/or omit the steps shown. The scope of this disclosure is not limited in this regard.

The term "include/comprise" and its variations used herein are open-ended, i.e. "including but not limited to". The term "based on" means "at least partially based on". The term "one embodiment" means "at least one embodiment";

the term "another embodiment" means "at least one additional embodiment"; and the term "some embodiments" means "at least some embodiments". Relevant definitions of other terms will be given in the following description.

It should be noted that the concepts of "first" and "second" mentioned in this disclosure are only used to distinguish different devices, modules, or units, and are not used to limit the order or interdependence of the functions performed by these devices, modules, or units.

It should be noted that the modification of "one" mentioned in this disclosure is illustrative and not restrictive. Those skilled in the art should understand that it is interpreted as "one or more" unless otherwise specified in the context.

The names of the messages or information exchanged between a plurality of devices in the present disclosure are for illustrative purposes only and are not intended to limit the scope of these messages or information.

The following in conjunction with the accompanying drawings, embodiments of the present disclosure are described in details.

As shown in FIG. 1, FIG. 1 is a flowchart of a method for information processing according to embodiments of the present disclosure, including the following steps.

S11: displaying first task information and a target identifier associated with the first task information.

Figure 2:
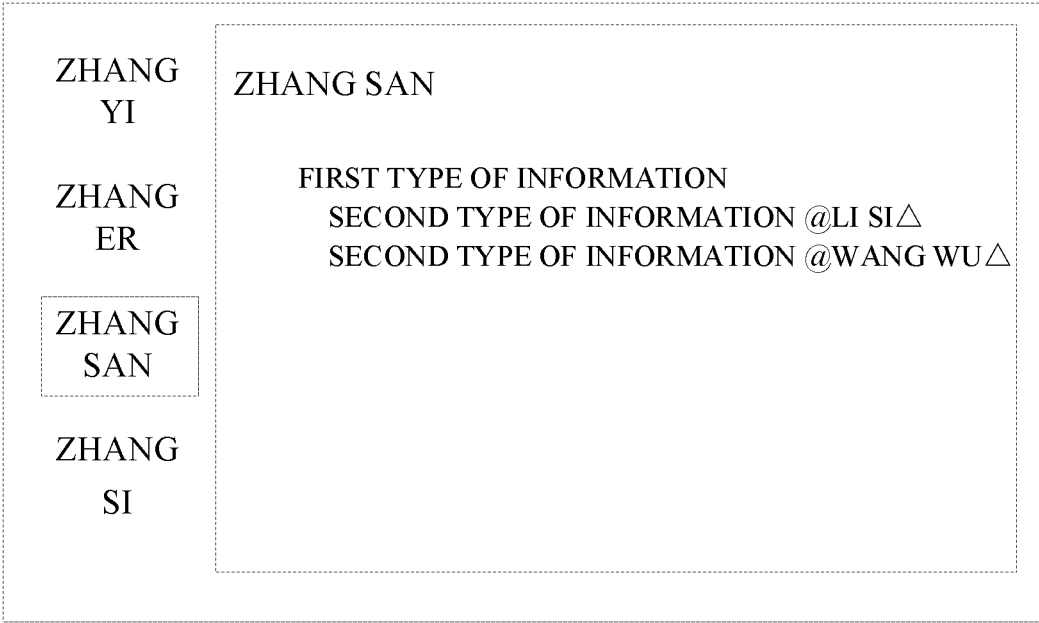
FIG. 2 is a schematic diagram of displaying task information according to embodiments of the present disclosure.
Figure 3:
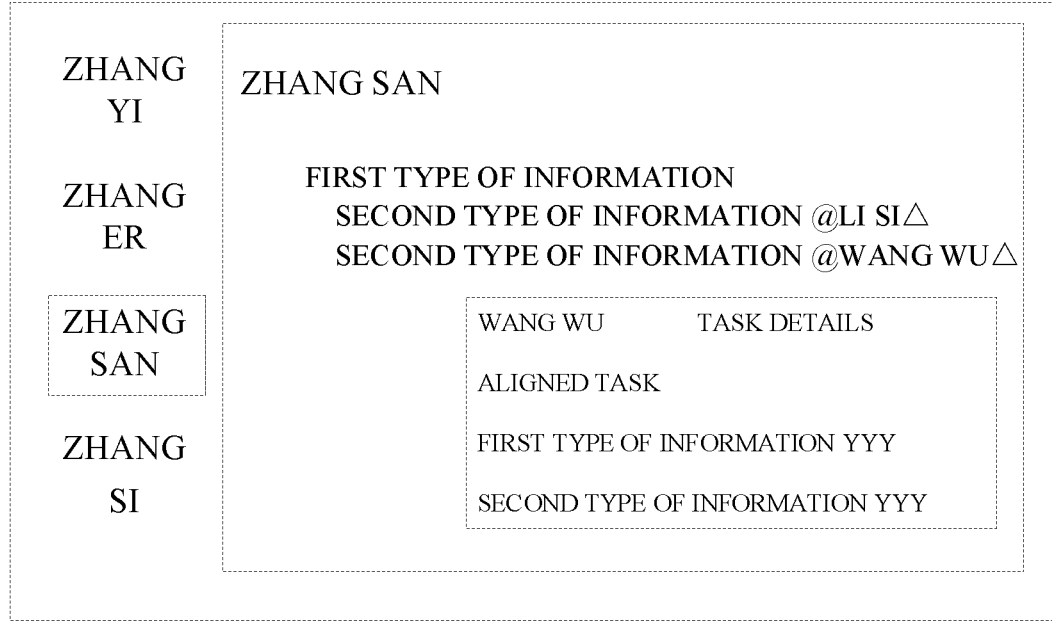
FIG. 3 is a schematic diagram of displaying a target identification after the first operation is performed according to embodiments of the present disclosure.

In some embodiments, the first task information may be task information associated with a certain user, for example, may be a task information of which the certain user is in charge. Referring to FIG. 2, the user "Zhang San" is selected in FIG. 2, thus the task information of which Zhang San is in charge is displayed. The task information may include a first type of information and a second type of information. The second type of information is associated with the first type of information, for example, the task information may be target and key node information, the first type of information may be target information, and the second type of information may be key node information. The first task information has an associated target identifier, which may be, for example, symbols or text.

S12: in response to a first operation for the target identifier, the second task information associated with the first task information is displayed, in presence of second task information associated with the first task information.

In some embodiments, the target identifier can be operated, the target identifier may have associated second task information. After a first operation (e.g., click) is performed on the target identifier, it may be determined whether the first task information is associated with the second task information. If the first task information is associated with the second task information, the second task information is displayed. The second task information may be displayed in a pop-up window or a floating window on a displaying interface of the first task information, so that the user can quickly know the task information associated with the first task information, thereby improving efficiency of viewing task information.

In some embodiments of the present disclosure, displaying the target identifier includes: displaying a first identifier and a second identifier included in the target identifier; where the first identifier is used to characterize a target user associated with the second task information, the second identifier is used to characterize an association relationship between the second task information and the first task information.

In some embodiments, referring to FIG. 2. "@Li Si Δ" in FIG. 2 schematically shows a target identifier, "@Li Si" in the target identifier is the first identifier, and "Δ" in the target identifier is the second identifier. The target identifier can be used to remind the target user corresponding to the first identifier. In this embodiment, the first identifier of the target user has been displayed in step S11. After the first operation is performed on the target identifier, it can be determined whether the second task information associated with the target user is associated with the first task information. In some embodiments of the present disclosure, the second identifier can be automatically generated after the first identifier is input. The shape of the second identifier may represent the type of association relationship between the first task information and the second task information. There may be a plurality of types of association, such as dependency relationships of tasks (one task must be completed to complete another task), sequential relationships of time completions, and alignment relationships of task information. In some embodiments, after the first operation is performed on the target identifier, the second task information is displayed in the pop-up window. A representation control of detailed information of the second task information may also be displayed in the pop-up window. After the representation control is triggered, the detailed information of the second task information may be displayed.

In some embodiments of the present disclosure, a display style of the target identifier is related to at least one of the following: an association status between the first task information and the second task information, a permissions of the target user and a current user. In some embodiments, the display style of the target identifier is not fixed. A change in the above mentioned related information may be determined based on the display style of the target identifier, thereby reducing the user's operation. The current user is the user who performs the first operation.

In some embodiments of the present disclosure, the display style of the first identifier is determined based on a permission of the current user and a permission of the target user. In this way, the display style of the first identifier matches the permissions of the current user and the target user, and is able to indicate the permissions.

In some embodiments of the present disclosure, a display style of the second identifier is determined based on an association status between the first task information and the second task information, so that the display style of the second identifier can directly reflect whether the first task information is associated with the second task information, without performing other operations.

In some embodiments of the present disclosure, determining the display style of the first identifier based on the permission of the current user and the permission of the target user includes: if the current user does not have a first permission for the first task information, displaying the first identifier in the first style. If the current user has the first permission for the first task information, the display style of the first identifier may be determined based on the permission of the target user.

In some embodiments, displaying the first identifier in a first style may refer to setting a color of the first identifier to be a first color. The first color may be, for example, blue. In this way, when the first identifier is displayed in the first style, it may directly determine that the current user does not have the first permission for the first task information. The first permission may be, for example, a view permission, identifying the current user does not have the right/authorization/permission to view specific contents of the first task information. In some embodiments, when the current user has the first permission for the first task information, it is necessary to further determine the permission of the target user.

In some embodiments of the present disclosure, determining the display style of the first identifier based on the permission of the target user include: if the target user does not have a second permission for the first task information, displaying the first identifier in a second style; or if the target user has the second permission for the first task information, displaying the first identifier in a third style.

In some embodiments, the second permission may be, for example, a view permissions, the target user does not have the view permission for the first task information indicates that the target user can not view the specific content of the first task information, in which case the first identifier is displayed in the second style, for example, the display color of the first identifier may be set to gray. If the target user has a second permission for the first task information, the first identifier is displayed in a third style, and the third style may be the same as the first style, for example, the display color of the first identifier may be set to blue. In this embodiment, the display style of the first identifier can reflect whether the target user has a second permission for the first task information, so that the permission information can be known through the display style without user operation.

In some embodiments of the present disclosure, determining the display style of the second identifier based on the association status between the first task information and the second task information includes: if the first task information is associated with the second task information, displaying the second identifier in a fourth style; or, if the first task information does not have an association with the second content, displaying the second identifier in the fifth style.

In some embodiments, whether the first task information associated with the second content information may affect the display style of the first task information. Displaying the second identifier in the fourth style may refer to setting a display color of the second identifier to be blue, and displaying the second identifier in the fifth style may refer to setting the display color of the second identifier to be gray. Through differences between display styles, it can determine whether there is the second task information associated with the first task information based on the display style before performing the first operation, thereby reducing user's operation.

Figure 4:
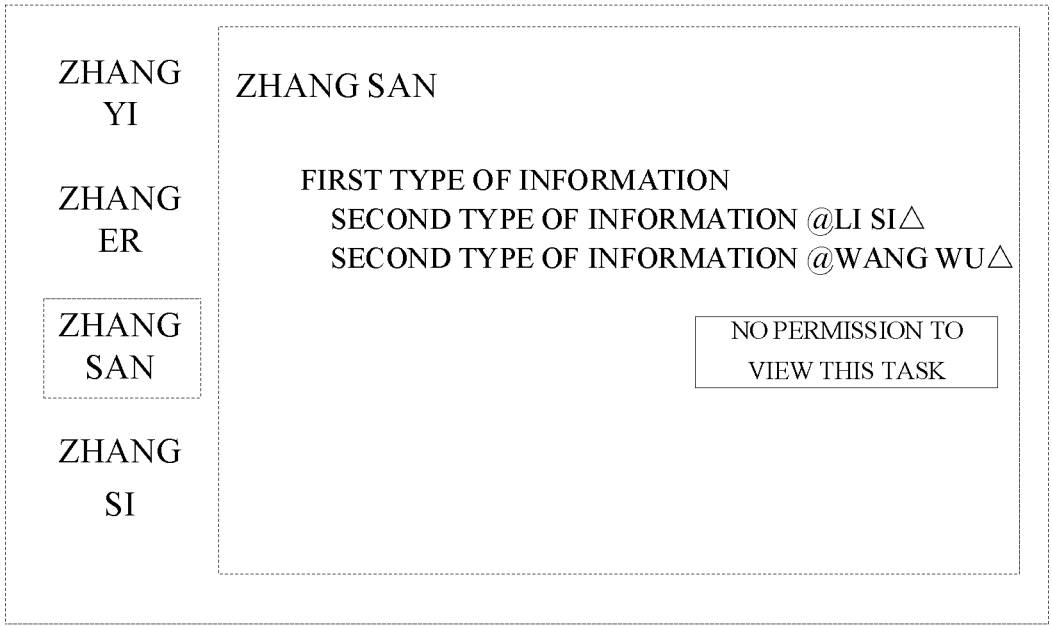
FIG. 4 is a schematic diagram of displaying a target identification after the second operation is performed according to embodiments of the present disclosure.

In some embodiments of the present disclosure, in response to the first operation, before displaying the second task information associated with the first task information, the method further includes: determining that a current user has a third permission for the target user, where if the current user does not have the third permission, the second task information is not displayed and first preset information is displayed. In some embodiments, after receiving the first operation, it may determine whether the current user performing the first operation has the third permission for the target user, for example, the third permission may be a permission for viewing the second task information of the target user. Only if the current user has the third permission, the second content information is displayed, if the current user does not have the third permission for the target user, the second content information cannot be displayed as shown in FIG. 4. Meanwhile, the first preset information is displayed, for example, it can be displayed as no permission to view the task.

In some embodiments of the present disclosure, in response to the first operation, before displaying the second task information associated with the first task information, the method further includes: determining that the current user has a fourth permission for the first task information, where if the current user does not have the fourth permission for the first task information, second preset information is displayed. In some embodiments, the fourth permission may be, for example, a view permission, in the case where the current user has the fourth permission for the first task information, it is able to view the second content information associated with the first task information, otherwise it is impossible to view the second task information associated with the first task information. At this time, the second preset information may be displayed, for example, the second preset information may be prompting the current user not to have the fourth permission.

In some embodiments of the present disclosure, the method further include: if the target user does not have the fourth permission for the first task information, displaying third preset information in response to the second operation for the target identifier. In some embodiments, the fourth permission may be, for example, a view permission, the second operation is different from the first operation, the second operation is, for example, a hover operation of controlling a identifier on the target identifier, the third preset information can be displayed by performing the second operation, the third preset information, for example, may be "no permission to view this task."

Figure 5:
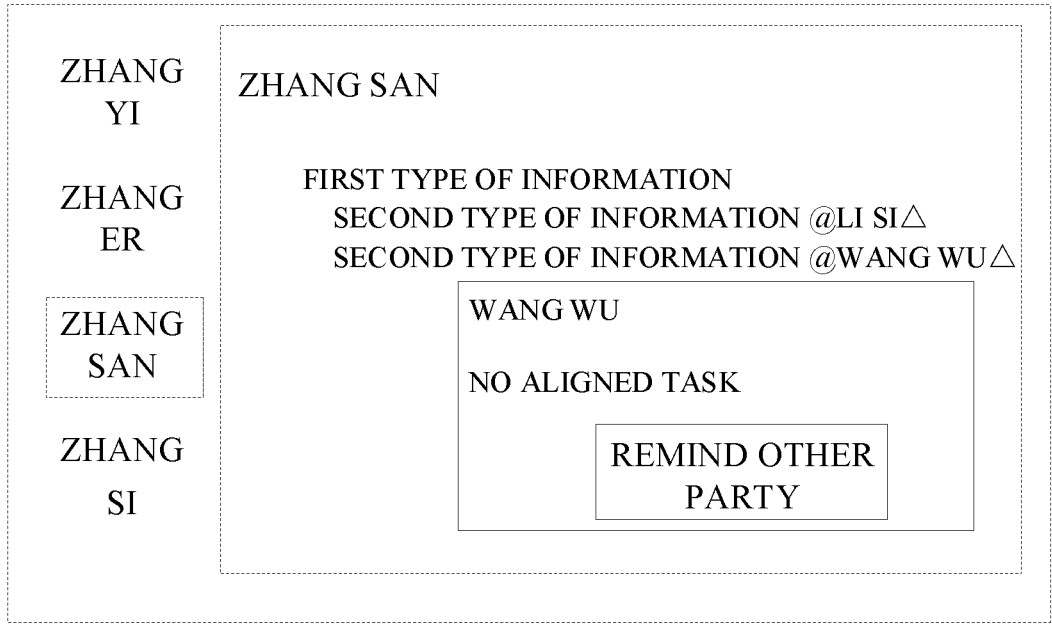
FIG. 5 is a schematic diagram of displaying a target identification after the first operation is performed according to embodiments of the present disclosure.

In some embodiments of the present disclosure, the method further includes: in response to the first operation for the target identifier, if no second task information associated with the first task information is present, displaying fourth preset information. In some embodiments, if there is no second task information associated with the first task information in step S12, that is, the second task information is not associated with the first task information, the second task information cannot be displayed at this time, as shown in FIG. 5, the fourth preset information can be displayed to indicate that the second task information associated with the first task information is not present.

In some embodiments of the present disclosure, the method further includes: in response to the first operation for the target identifier, if no second task information associated with the first task information is present and the current user is an associated user of the first task information, displaying a reminder control, and the reminder control being used to send reminder information to a target user associated with the second task information after being triggered, the reminder information being used to remind to associate the second task information with the first task information. In some embodiments, the target identifier is used to instruct the target user to associate the second task information with the first task information. When the second task information is not associated with the first task information, the reminder information may be sent to the target user by the reminder control (such as "remind other party" in FIG. 5). In some embodiments, when the first task information is in the non-editing state, the reminder control can be displayed, and when the first task information is in the editing state, the reminder control is not displayed.

As shown in FIG. 6, after the reminder control is triggered, an information window is displayed, which is used to input relevant contents of the reminder information. The information window may include a title area and a content area, which may have default contents. After a determination (i.e., OK) control of the information window is triggered, the reminder information is sent to the target user. After the determination control is triggered, it can be checked whether the title area and the content area are empty. If they are empty, a reminder can be displayed. If they are not empty, the information window is closed, and the reminder information can be prompted that it has been sent.

In some embodiments of the present disclosure, if the reminder control is triggered, it is determined whether the second task information is associated with the first task information. If the second task information is not associated with the first task information, the reminder information may be sent. Otherwise, the reminder information may not be sent and the fifth preset information is displayed. In some embodiments, the first task information may be displayed on a webpage, and a page of the webpage may not be updated in a timely manner. Therefore, the current second task information and the first task information may have been associated, but the webpage does not show the association relationship between them. Thus, before sending the reminder information, it may once again detect whether the first task information is associated with the second task information. If the second task information has not been associated with the first task information, the reminder information is sent, otherwise the reminder information is not sent, and the fifth preset information can be displayed. The fifth preset information can be used to indicate, for example, that the target user has associated the second task information with the first task information.

In some embodiments of the present disclosure, after sending the reminder information, the reminder information is displayed on the target communication application of the target user. In some embodiments, the target communication application may be a communication application that is previously bound to the system that presents the first task information, so that the user can receive a notification in real time. In some embodiments, the reminder information displayed on the target communication application is used to open the page where the second task information, after the reminder information is triggered. In this way, the user can quickly jump to the page of the second task information by the reminder information, thereby associating the second task information with the first task information.

In some embodiments of the present disclosure, the method further includes: in response to the first operation for the target identifier, displaying reminder history information of the target user. In some embodiments, as shown in FIG. 7, after the first operation is performed on the target identifier, the reminder history information may be displayed. The reminder history information may represent the relevant information where the reminder information has been sent to the target user, for example, when the reminder information is sent to the target user, so as to avoid the user repeatedly sending the reminder information.

In some embodiments of the present disclosure, the target identifier is displayed in an associated area of the first task information, for example, it can be displayed on the peripheral side of the first task information. In some embodiments of the present disclosure, the target identifier is displayed when the first task information is in the editing state and/or a post state. The editing state refers to a state of modifying the first task information, and the post state refers to a state in which the first task information is displayed. In some embodiments of the present disclosure, when the first task information is associated with the current user or a non-current user, the target identifier may be displayed.

In order to better illustrate the method proposed in the present disclosure, the first task information and the second task information are used as examples to illustrate the target and key node information. The first type of information can be target information, and the second type of information can be key node information. Sometimes, the target user is reminded to associate the task information with the first task information by @target user in the first task information, but the user cannot quickly know which task information is associated with the first task information. Therefore, as shown in FIG. 2, when displaying the first task information and the target identifier, the target identifier may include a first identifier for identifying the user and a second identifier for identifying the association relationship. The association relationship can be aligned, a display position of the second identifier can be on the right side of the first identifier, and the second identifier is displayed when the first task information is in the post or editing state. The second identifier may be displayed whether viewing own task information or others' task information.

If the second task information is associated with the first task information, and if the target identifier has the permission to view the first task information, both the first identifier and the second identifier are displayed in blue. After the operation is performed on the target identifier, the floating window displays the second task information associated with the first task information of the target object. Before displaying the second task information, the current user's permission may be judged. If the current user does not have the view permission, the second task information may not be displayed, but the preset information may be displayed.

If the second task information is associated with the first task information and the target user does not have the permission to view the first task information, the first identifier is displayed in blue and the second identifier is display in gray. The control identifier may be hovered over the target identifier, no permission to view will be displayed. After performing the first operation on the target identifier, the second task information is displayed in the floating window, and the target object not having the permission to view the first task information may be displayed in the floating window.

If the second task information is associated with the first task information, and the current user does not have the permission to view the task information of the target object, both the first identifier and the second identifier are displayed in blue, and after the first operation is performed on the target identifier, a prompt message indicating no permission to view the task information of the target user may be displayed.

If the second task information is not associated with the first task information, and the target object does not have the permission to view the first task information, the first and second identifiers are displayed in gray, and a prompt message indicating that the target user does not have the permission to view the task information is displayed after the control identifier hovers over the target identifier. After the first operation is performed on the target identifier, the floating window displays a prompt message indicating that there is currently no associated task information. And the floating window displays that the target user does not have the permission to view the first task information.

If the second task information is not associated with the first task information and the first task information is the current user's task information, the first identifier may be displayed in blue and the second identifier may be displayed in gray. After the first operation is performed on the target identifier, the floating window displays that there is currently no associated task and displays the reminder control. If the task information is in the editing state, the reminder control may not be displayed. After clicking the reminder control, the reminder information can be sent. The reminder information may be sent to the target communication application of the target user. After the reminder information is triggered, it may jump to the page of the task information corresponding to the target user.

Due to the possibility that the front-end page may not be updated in a timely manner, which may cause that the target user has already associated the first task information with the second task information when the reminder is sent. Therefore, it is necessary to determine whether the second task information is associated with the first task information before sending the reminder information. If it is already associated when sending the reminder information, the reminder information may not be sent and may be reminded.

If the second task information is not associated with the first task information, and the first task information is not the current user's task information, the first identifier may be displayed in blue, and the second identifier may be displayed in gray. After the first operation is performed on the target identifier, the floating window may display prompt information such as currently no associated task information.

An apparatus for information processing is provided in some embodiments of the present disclosure, including:

a display unit configured to display first task information and a target identifier associated with the first task information;

a control unit configured to in response to a first operation for the target identifier, display the second task information associated with the first task information, in presence of second task information associated with the first task information.

In some embodiments of the present disclosure, displaying the target identifier includes: displaying a first identifier and a second identifier included in the target identifier; where the first identifier is used for characterizing a target user associated with the second task information, and the second identifier is used for characterizing an association between the second task information and the first task information.

In some embodiments of the present disclosure, a display style of the target identifier is related to at least one of the following: an association status between the first task information and the second task information, a permission of the target user, and a permission of a current user.

In some embodiments of the present disclosure, the display unit is configured to determine a display style of the first identifier based on a permission of a current user and a permission of the target user.

In some embodiments of the present disclosure, the display unit is configured to determine a display style of the second identifier based on an association status between the first task information and the second task information.

In some embodiments of the present disclosure, the display unit determines the display style of the first identifier based on the permission of a current user and the permission of the target user includes: if the current user does not have a first permission for the first task information, displaying the first identifier in the first style; or if the current user has the first permission for the first task information, determining the display style of the first identifier based on the permission of the target user.

In some embodiments of the present disclosure, the display unit determines the display style of the first identifier based on the permission of the target user includes: if the target user does not have a second permission for the first task information, displaying the first identifier in a second style; or if the target user has the second permission for the first task information, displaying the first identifier in a third style.

In some embodiments of the present disclosure, the display unit determines a display style of the second identifier based on an association status between the first task information and the second task information includes: if the first task information is associated with the second task information, displaying the second identifier in a fourth style; or if the first task information does not have an association with the second content, displaying the second identifier in the fifth style.

In some embodiments, the control unit is further configured to in response to the first operation, before displaying the second task information associated with the first task information, determine that a current user has a third permission for the target user, wherein if the current user does not have the third permission, skip displaying the second task information and displaying first preset information; and/or, determine that the current user has a fourth permission for the first task information, wherein if the current user does not have the fourth permission for the first task information, display second preset information.

In some embodiments of the present disclosure, the control unit is further configured to if the target user does not have a fourth permission for the first task information, display third preset information in response to the second operation for the target identifier.

In some embodiments of the present disclosure, the control unit is further configured to in response to the first operation for the target identifier, if no second task information associated with the first task information is present, display fourth preset information.

In some embodiments of the present disclosure, the control unit is further configured to in response to a first operation for the target identifier, if no second task information associated with the first task information is present and the current user is an associated user of the first task information, display a reminder control, and the reminder control being used to send reminder information to a target user associated with the second task information after being triggered, the reminder information being used to remind to associate the second task information with the first task information.

In some embodiments of the present disclosure, the control unit is configured to if the reminder control is triggered, determine whether the second task information is associated with the first task information; if the second task information is not associated with the first task information, send the reminder information; otherwise, skip sending the reminder information and displaying fifth preset information.

In some embodiments of the present disclosure, after sending the reminder information, displaying the reminder information on a target communication application of the target user.

In some embodiments of the present disclosure, the reminder information displayed on the target communication application is used to open a page where the second task information is located after being triggered.

In some embodiments of the present disclosure, the control unit is further configured to in response to the first operation for the target identifier, display reminder history information of the target user.

In some embodiments of the present disclosure, at least one of the following is satisfied: displaying the target identifier in an associated area of the first task information; displaying the target identifier when the first task information is in an editing status or a posting status; displaying the target identifier when the first task information is task information associated with the current user or a non-current user.

As for embodiments of the apparatus, since it basically corresponds to method embodiments, the relevant parts can be referred to the partial description of the method embodiments. The apparatus embodiments described above are only illustrative, and the modules described as separate modules may or may not be separate. Some or all of the modules can be selected according to actual needs to achieve the purpose of the disclosure. Ordinary skilled person in the field can understand and implement it without creative efforts.

Above, based on embodiments and application examples, method and apparatus of the present disclosure are described. In addition, the present disclosure also provides a terminal device and a storage medium, the following description of these terminal devices and storage media.

Figure 8:
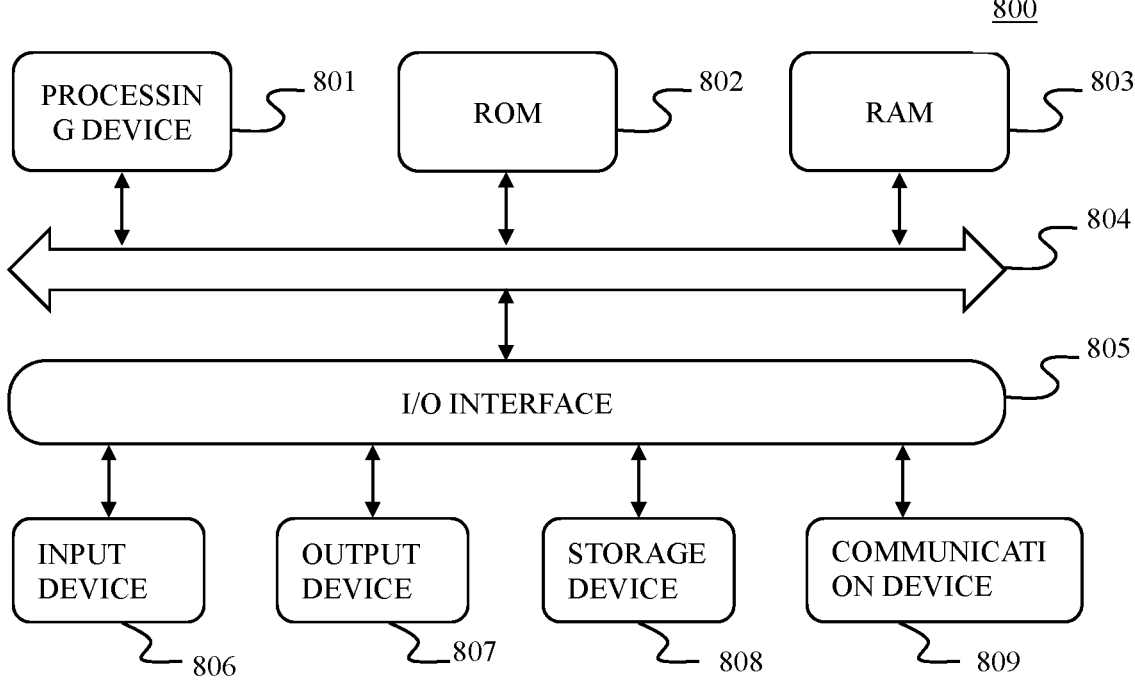
FIG. 8 is a schematic diagram of an electronic device according to embodiments of the present disclosure.

Referring now to FIG. 8, which shows a schematic structural diagram of an electronic device suitable for implementing embodiments of the present disclosure (e.g., terminal device or server) 800. The terminal device in the present disclosure embodiment may include, but are not limited to, mobile end devices, such as mobile phones, laptops, digital broadcast receivers, personal digital assistants (PDAs), PADs (tablets), portable multimedia players (PMPs), car end points (e.g., car navigation end points), and the like, as well as fixed end points such as digital TVs, desktop computers, and the like. The electronic device shown in the figure is only one example and should not bring any limitation on the functionality and scope of use of the present disclosure embodiment.

The electronic device 800 may include a processing device (such as a central processor, graphics processing unit, etc.) 801, which can perform various appropriate actions and processes based on programs stored in read-only memory (ROM) 802 or loaded from storage device 808 into random access memory (RAM) 803. In RAM 803, various programs and data required for the operation of electronic device 800 are also stored. Processing devices 801, ROM 802, and RAM 803 are connected to each other through bus 804. Input/output (I/O) interface 805 is also connected to bus 804.

Typically, the following devices can be connected to the I/O interface 805: an input device 806, including touch screen, touchpad, keyboard, mouse, camera, microphone, accelerometer, gyroscope, etc.; an output device 807, including liquid crystal display (LCD), speaker, vibrator, etc.; a storage devices 808, including magnetic tape, hard disk, etc.; and a communication device 809. The communication devices 809 can allow the electronic device 800 to communicate wirelessly or wirelessly with other devices to exchange data. Although electronic devices 800 with various devices are shown in the figure, it should be understood that it is not required to implement or have all of the devices shown. More or fewer devices can be implemented or provided instead.

In particular, according to embodiments of the present disclosure, the process described above with reference to the flowchart may be implemented as a computer software program. For example, embodiments of the present disclosure include a computer program product comprising a computer program carried on a computer-readable medium, the computer program comprising program code for performing the method shown in the flowchart. In such embodiments, the computer program may be downloaded and installed from the network via the communication device

809, or installed from the storage device 808, or installed from the ROM 802. When the computer program is executed by the processing device 801, the above-described functions defined in the method of the present disclosure are performed.

It should be noted that the computer-readable medium described above in this disclosure can be a computer-readable signal medium or a computer-readable storage medium or any combination thereof. The computer-readable storage medium can be, for example, but not limited to, an electrical, magnetic, optical, electromagnetic, infrared, or semiconductor system, device, or any combination thereof. More specific examples of computer-readable storage media can include but are not limited to: an electrical connection with one or more wires, a portable computer disk, a hard disk, random access memory (RAM), read-only memory (ROM), erasable programmable read-only memory (EPROM or flash memory), optical fibers, portable compact disk read-only memory (CD-ROM), optical storage devices, magnetic storage devices, or any suitable combination thereof. In this disclosure, a computer-readable storage medium can be any tangible medium containing or storing a program that can be used by or in conjunction with an instruction execution system, device, or device. In this disclosure, a computer-readable signal medium can include a data signal propagated in a baseband or as part of a carrier wave, which carries computer-readable program code. Such propagated data signals can take many forms, including but not limited to electromagnetic signals, optical signals, or any suitable combination thereof. Computer-readable signal media can also be any computer-readable medium other than computer-readable storage media, which can send, propagate, or transmit programs for use by or in conjunction with instruction execution systems, devices, or devices. The program code contained on the computer-readable medium can be transmitted using any suitable medium, including but not limited to: wires, optical cables, radio frequency (RF), etc., or any suitable combination thereof.

In some embodiments, the client and server may communicate using any currently known or future developed network protocol such as HTTP (HyperText Transfer Protocol), and may be interconnected with any form or medium of digital data communication (e.g., a communication network). Examples of communication networks include local area networks ("LANs"), wide area networks ("WANs"), the Internet (e.g., the Internet), and end-to-end networks (e.g., ad hoc end-to-end networks), as well as any currently known or future developed networks.

The computer-readable medium can be included in the electronic device, or it can exist alone and not assembled into the electronic device.

The computer-readable medium carries one or more programs, and when the one or more programs are executed by the electronic device, the electronic device performs the method disclosed above.

Computer program code for performing the operations of the present disclosure may be written in one or more programming languages, or combinations thereof, including Object Oriented programming languages such as Java, Smalltalk, C++, as well as conventional procedural programming languages such as "C" or similar programming languages. The program code may be executed entirely on the user's computer, partially on the user's computer, as a standalone software package, partially on the user's computer, or entirely on a remote computer or server. In the case of a remote computer, the remote computer may be connected to the user's computer via any type of network, including a local area network (LAN) or a wide area network (WAN), or may be connected to an external computer (e.g., via the Internet using an Internet service provider).

The flowcharts and block diagrams in the accompanying drawings illustrate the architecture, functions, and operations of systems, methods, and computer program products that may be implemented in accordance with various embodiments of the present disclosure. in this regard, each block in the flowchart or block diagram may represent a module, program segment, or portion of code that contains one or more executable instructions for implementing a specified logical function. It should also be noted that in some alternative implementations, the functions marked in the blocks may also occur in a different order than those marked in the figures. For example, two blocks represented in succession may actually be executed substantially in parallel, and they may sometimes be executed in the opposite order, depending on the function involved. It should also be noted that each block in the block diagram and/or flowchart, and combinations of blocks in the block diagram and/or flowchart, may be implemented using a dedicated hardware-based system that performs the specified function or operation, or may be implemented using a combination of dedicated hardware and computer instructions.

Described in the present embodiment relates to the disclosed unit may be implemented by way of software, may be implemented by way of hardware, wherein the name of the unit does not constitute a limitation on the unit itself in some cases.

The functions described above herein may be performed at least in part by one or more hardware logic components. For example, without limitation, exemplary types of hardware logic components that may be used include: field programmable gate arrays (FPGAs), application specific integrated circuits (ASICs), application specific standard products (ASSPs), system-on-chip (SOCs), complex programmable logic devices (CPLDs), and the like.

In the context of this disclosure, machine-readable media can be tangible media that can contain or store programs for use by or in conjunction with instruction execution systems, devices, or devices. Machine-readable media can be machine-readable signal media or machine-readable storage media. Machine-readable media can include, but are not limited to, electronic, magnetic, optical, electromagnetic, infrared, or semiconductor systems, devices, or devices, or any suitable combination thereof. More specific examples of machine-readable storage media may include electrical connections based on one or more wires, portable computer disks, hard disks, random access memory (RAM), read-only memory (ROM), erasable programmable read-only memory (EPROM or flash memory), optical fibers, convenient compact disk read-only memory (CD-ROM), optical storage devices, magnetic storage devices, or any suitable combination thereof.

According to one or more embodiments of the present disclosure, there is provided a method of processing information, including:

displaying first task information and a target identifier associated with the first task information;

in response to a first operation for the target identifier, if second task information associated with the first task information is present, displaying the second task information associated with the first task information.

According to one or more embodiments of the present disclosure, there is provided a method for information processing, where displaying the target identifier comprises: displaying a first identifier and a second identifier comprised in the target identifier;

wherein the first identifier is used for characterizing a target user associated with the second task information, and the second identifier is used for characterizing an association between the second task information and the first task information.

According to one or more embodiments of the present disclosure, there is provided a method for processing information, a display style of the target identifier is related to at least one of the following:

an association status between the first task information and the second task information, a permission of the target user, and a permission of a current user.

According to one or more embodiments of the present disclosure, there is provided a method for processing information, comprising:

determining a display style of the first identifier based on a permission of a current user and a permission of the target user; and/or determining a display style of the second identifier based on an association status between the first task information and the second task information.

According to one or more embodiments of the present disclosure, there is provided a method for information processing, where determining a display style of the first identifier based on a permission of a current user and a permission of the target user comprises:

if the current user does not have a first permission for the first task information, displaying the first identifier in the first style; or, if the current user has the first permission for the first task information, determining the display style of the first identifier based on the permission of the target user.

According to one or more embodiments of the present disclosure, there is provided a method for processing information, where determining the display style of the first identifier based on the permission of the target user comprises:

if the target user does not have a second permission for the first task information, displaying the first identifier in a second style; or if the target user has the second permission for the first task information, displaying the first identifier in a third style.

According to one or more embodiments of the present disclosure, there is provided a method for information processing, where determining a display style of the second identifier based on an association status between the first task information and the second task information comprises:

if the first task information is associated with the second task information, displaying the second identifier in a fourth style; or, if the first task information does not have an association with the second content, displaying the second identifier in the fifth style.

According to one or more embodiments of the present disclosure, there is provided a method for information processing, where in response to the first operation, before displaying the second task information associated with the first task information, the method further comprises:

determining that a current user has a third permission for the target user, wherein if the current user does not have the third permission, skipping displaying the second task information and displaying first preset information; and/or determining that the current user has a fourth permission for the first task information, wherein if the current user does not have the fourth permission for the first task information, displaying second preset information.

According to one or more embodiments of the present disclosure, there is provided a method for processing information, comprising:

if the target user does not have a fourth permission for the first task information, displaying third preset information in response to the second operation for the target identifier.

According to one or more embodiments of the present disclosure, there is provided a method for processing information, further comprising:

in response to a first operation for the target identifier, if no second task information associated with the first task information is present, displaying fourth preset information.

According to one or more embodiments of the present disclosure, there is provided a method of processing information, further comprising:

in response to a first operation for the target identifier, if no second task information associated with the first task information is present and the current user is an associated user of the first task information, displaying a reminder control, and the reminder control being used to send reminder information to a target user associated with the second task information after being triggered, the reminder information being used to remind to associate the second task information with the first task information.

According to one or more embodiments of the present disclosure, there is provided a method for processing information, where if the reminder control is triggered, determining whether the second task information is associated with the first task information; if the second task information is not associated with the first task information, sending the reminder information; otherwise, skipping sending the reminder information and displaying fifth preset information.

According to one or more embodiments of the present disclosure, there is provided a method for processing information, further comprising:

after sending the reminder information, displaying the reminder information on a target communication application of the target user.

According to one or more embodiments of the present disclosure, there is provided a method for processing information, where the reminder information displayed on the target communication application is used to open a page where the second task information is located after being triggered.

According to one or more embodiments of the present disclosure, there is provided a method for processing information, further comprising:

in response to the first operation for the target identifier, displaying reminder history information of the target user.

According to one or more embodiments of the present disclosure, there is provided a method for processing information, at least one of the following is satisfied:

displaying the target identifier in an associated area of the first task information;

displaying the target identifier when the first task information is in an editing status or a posting status;

displaying the target identifier when the first task information is task information associated with the current user or a non-current user.

According to one or more embodiments of the present disclosure, there is provided an apparatus for information processing, comprising:

a display unit configured to display first task information and a target identifier associated with the first task information;

a control unit configured to in response to a first operation for the target identifier, if second task information associated with the first task information is present, display the second task information associated with the first task information.

According to one or more embodiments of the present disclosure, there is provided a terminal device comprising: at least one memory and at least one processor;

wherein the at least one memory is used for storing program codes, and the at least one processor is used for invoking the program codes stored in the at least one memory to perform any of the methods described in the above.

According to one or more embodiments of the present disclosure, there is provided a computer-readable storage medium, wherein the program codes, when executed by a processor, cause the processor to perform the method described above.

The above description is only the example embodiment of the present disclosure and an explanation of the technical principles used. Those skilled in the art should understand that the scope of the disclosure involved in this disclosure is not limited to the specific combination of the technical features of the above technical solutions but should also cover other technical solutions formed by any combination of the above technical features or equivalent features without departing from the above disclosure concept. For example, the technical solutions formed by replacing the above features with (but not limited to) technical features with similar functions disclosed in this disclosure.

In addition, although the operations are depicted in a specific order, this should not be understood as requiring these operations to be performed in the specific order shown or in sequential order. Under certain circumstances, multitasking and parallel processing may be advantageous. Similarly, although several specific implementation details are included in the above discussion, these should not be construed as limiting the scope of the present disclosure. Certain features described in the context of individual embodiments may also be implemented in combination in a single embodiment. Conversely, various features described in the context of a single embodiment may also be implemented in multiple embodiments individually or in any suitable sub combination.

While the subject matter has been described in language specific to structural features and/or methodological logical acts, it should be understood that the subject matter defined in the appended claims is not necessarily limited to the particular features or acts described above. Rather, the particular features and acts described above are merely exemplary forms of implementation of the claims.

We claim:

1. A method for information processing, comprising:

displaying first task information and an identifier associated with the first task information; and in response to a first operation for the identifier, displaying second task information associated with the first task information, in presence of second task information associated with the first task information, wherein displaying the identifier comprises:

displaying a first identifier and a second identifier comprised in the identifier, and wherein the first identifier is used for characterizing a user associated with the second task information, and the second identifier is used for characterizing an association between the second task information and the first task information.

2. The method of claim 1, wherein a display style of the identifier is related to at least one of the following:

an association status between the first task information and the second task information, a permission of the user, and a permission of a current user.

3. The method of claim 1, comprising:

determining a display style of the first identifier based on a permission of a current user and a permission of the user; and/or determining a display style of the second identifier based on an association status between the first task information and the second task information.

4. The method of claim 3, wherein determining a display style of the first identifier based on a permission of a current user and a permission of the user comprises:

in response to that the current user does not have a first permission for the first task information, displaying the first identifier in the first style; or in response to that the current user has the first permission for the first task information, determining the display style of the first identifier based on the permission of the user.

5. The method of claim 4, wherein determining the display style of the first identifier based on the permission of the user comprises:

in response to that the user does not have a second permission for the first task information, displaying the first identifier in a second style; or in response to that the user has the second permission for the first task information, displaying the first identifier in a third style.

6. The method of claim 4, wherein determining a display style of the second identifier based on an association status between the first task information and the second task information comprises:

in response to that the first task information is associated with the second task information, displaying the second identifier in a fourth style; or in response to that the first task information does not have an association with the second content, displaying the second identifier in the fifth style.

7. The method of claim 1, wherein in response to the first operation, before displaying the second task information associated with the first task information, the method further comprises:

determining that a current user has a third permission for the user, wherein in response to that the current user does not have the third permission, skipping displaying the second task information and displaying first preset information; and/or determining that the current user has a fourth permission for the first task information, wherein in response to that the current user does not have the fourth permission for the first task information, displaying second preset information.

8. The method of claim 1, further comprising:

in response to that the user does not have a fourth permission for the first task information, displaying third preset information in response to the second operation for the identifier.

9. The method of claim 1, further comprising:

in response to a first operation for the identifier, displaying fourth preset information, in absence of the second task information associated with the first task information.

10. The method of claim 1, further comprising:

in response to a first operation for the identifier, in accordance with a determination that no second task information associated with the first task information is present and the current user is an associated user of the first task information, displaying a reminder control, and the reminder control being used to send reminder information to a user associated with the second task information after being triggered, the reminder information being used to remind to associate the second task information with the first task information.

11. The method according to claim 10, wherein in response to that the reminder control is triggered, determining whether the second task information is associated with the first task information;

in response to that the second task information is not associated with the first task information, sending the reminder information;

otherwise, skipping sending the reminder information and displaying fifth preset information.

12. The method of claim 10, further comprising:

after sending the reminder information, displaying the reminder information on a communication application of the user.

13. The method of claim 12, wherein the reminder information displayed on the communication application is used to open a page where the second task information is located after being triggered.

14. The method of claim 10, further comprising:

in response to the first operation for the identifier, displaying reminder history information of the user.

15. The method of claim 1, wherein at least one of the following is satisfied:

displaying the identifier in an associated area of the first task information;

displaying the identifier when the first task information is in an editing status or a posting status;

displaying the identifier when the first task information is task information associated with the current user or a non-current user.

16. A terminal device comprising:

at least one memory and at least one processor;

wherein the at least one memory is used for storing program codes, and the at least one processor is used for invoking the program codes stored in the at least one memory to:

display first task information and an identifier associated with the first task information; and in response to a first operation for the identifier, display second task information associated with the first task information, in presence of second task information associated with the first task information, wherein displaying the identifier comprises:

displaying a first identifier and a second identifier comprised in the identifier, and wherein the first identifier is used for characterizing a user associated with the second task information, and the second identifier is used for characterizing an association between the second task information and the first task information.

17. The terminal device of claim 16, wherein a display style of the identifier is related to at least one of the following:

an association status between the first task information and the second task information, a permission of the user, and a permission of a current user.

18. A non-transitory computer-readable storage medium for storing program codes, wherein the program codes, when executed by a processor, cause the processor to:

display first task information and an identifier associated with the first task information; and in response to a first operation for identifier, display second task information associated with the first task information, in presence of second task information associated with the first task information, wherein displaying the identifier comprises:

displaying a first identifier and a second identifier comprised in the identifier, and wherein the first identifier is used for characterizing a user associated with the second task information, and the second identifier is used for characterizing an association between the second task information and the first task information.

\* \* \* \* \*